Feb. 25, 1936.                R. K. LEE ET AL                2,031,720
              METHOD OF MAKING BONDED RUBBER AND METAL ARTICLES
                              Filed Sept. 28, 1932
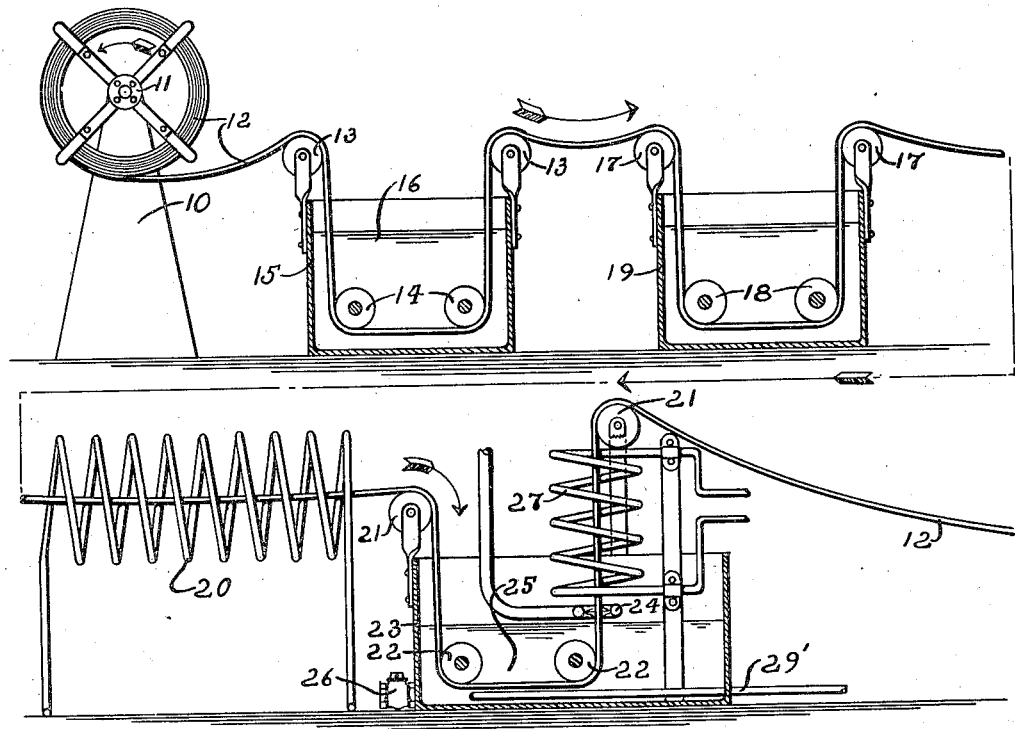
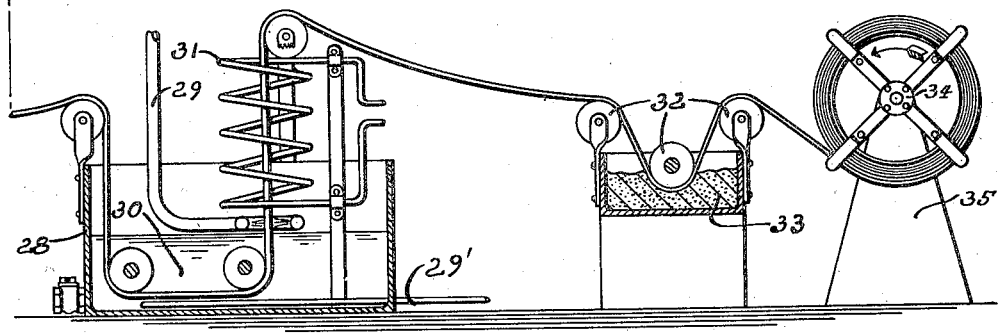
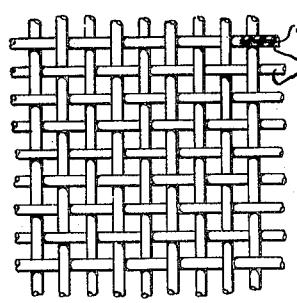
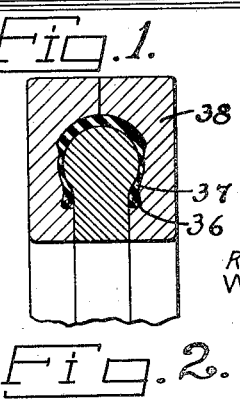
Fig. 1.
Fig. 3.
Fig. 4.
Fig. 2.
INVENTORS
ROGER K. LEE AND
WILLETT J. McCORTNEY.
BY
ATTORNEYS.

Patented Feb. 25, 1936

2,031,720

UNITED STATES PATENT OFFICE 2,031,720

METHOD OF MAKING BONDED RUBBER AND METAL ARTICLES

Roger K. Lee, Highland Park, and Willett J. McCortney, Royal Oak, Mich., assignors to Chrysler Corporation, Detroit, Mich., a corporation of Delaware Application September 28, 1932, Serial No. 635,188

15 Claims. (Cl. 18—59)

This invention relates to improved articles of the type which have a metal structure either coated with or fixed to rubber or embedded in a body including rubber and the method of making such articles, and particularly to an improved rubber coated wire stock for use in the fabrication of devices in which wire is partially or completely enveloped in rubber, as well as the method of making such stock.

One of the main objects of the invention is to provide an integral bond between a metal structure and an associated hard or soft rubber body.

Another object of the invention is to provide a connecting medium between a metal structure and the rubber of an article in which it is embodied which may comprise either hard or soft rubber and which has an integral bond with the metal structure and with the rubber content of the article.

Other objects of the invention are to provide metal stock for use in the fabrication of articles, which has integrally bonded thereto a layer of semi or partially cured rubber that is capable of being cured further to a hard rubber state during the vulcanization of the rubber content of the article in which it is embodied to either a hard or soft rubber condition; and to provide metal stock for use in fabrication of articles which has integrally bonded thereto a layer of semi-cured rubber that is capable of being cured further to only a soft rubber state during the vulcanization of the rubber content of the article in which it is embodied to either a hard or soft rubber condition.

A further object of the invention is to provide stock of this character of which the semi-cured rubber coating is capable of bonding integrally with the rubber content of the article in which it is embodied during curing of such rubber content, and which is also capable of integrally bonding with the semi-cured coating of other pieces of such metal stock.

A still further object of the invention is to provide an improved method for integrally bonding comparatively large masses of either hard or soft rubber to ferrous or non-ferrous metal surfaces.

Other objects of the invention are to provide an improved method of making articles including soft rubber having metal molded or otherwise embodied therein by which is formed a connecting layer of either hard or soft rubber which is integrally bonded with the metal and with the rubber content of such articles; and to provide a method of this character by which a metal structure may be incorporated in the body of an article including hard or soft rubber during the molding or other formation thereof and integrally bonded with the body of the article thereafter during curing of the article.

Further objects of the invention are to provide an improved method of making rubber coated articles from rubber coated stock; to provide a method of this character in which the rubber coating of the stock from which such articles are fabricated is converted to either a hard or soft rubber state as desired, and integrally bonded with the coating of contacting pieces of such stock or with any other body of rubber with which the coatings of the stock contact during a vulcanizing treatment; and to provide an improved method of this character for making rubber coated wire for general application, or wire stock for use in the fabrication of articles, by which the coating process may be conducted in a progressively continuous manner.

Another object of the invention is to provide an improved metal structure for articles, such as the beads of rubber tires which comprise successive convolutions of rubber coated wire stock having the coatings thereof integrally bonded together.

An illustrative embodiment of the invention is shown in the accompanying drawing, in which:

Fig. 1 is a schematic view illustrating diagrammatically an embodiment of my improved method.

Fig. 2 is a transverse sectional view of a tire mold and tire in which is embedded a metal element formed in accordance with our invention.

Fig. 3 is a fragmentary perspective view of the embedded metal structure shown in Fig. 2.

Fig. 4 is a fragmentary plan view illustrating a metal structure of the character which has its individual metal parts provided with an integrally bonded coating of either hard or soft rubber and in which the contacting portions of the rubber coatings are integrally bonded together.

In fabricating articles including rubber and metal and in manufacturing stock for use in the fabrication of such articles in accordance with our improved method, a coating composition having unvulcanized ingredients of rubber in a suitable solvent is employed. When it is desired to have a layer of hard rubber immediately adjacent the surfaces of the metal in the finished product, a coating composition is used which contains the ingredients required to promote curing thereof to a hard rubber state. A composition having the ingredients of soft rubber in unvulcanized state is employed when a soft rubber film or layer is desired. In either case the metal, which may have either ferrous or non-ferrous metal surfaces exposed at its exterior, is first cleaned and then heated to a temperature high enough to effect substantially complete removal of the solvent. Then, while the metal is heated, the coating composition is applied in a thin film-like layer from a spray nozzle, by a brush, or by immersing the metal part in a bath of the composition. The metal part and layer of coating composition is then heated to cause vulcanization of the coating to a partially or semi-cured state. The coated metal part is then incorporated into a body including unvulcanizable rubber by molding the body upon or around the coated metal part, or in any other manner. The resulting unit is thereafter heated in a suitable oven to effect vulcanization of the rubber of the body of the unit. During this treatment, the rubber coating is vulcanized further, either to a hard or soft rubber state, depending upon its composition and the duration of the curing treatment, and it is at the same time integrally bonded with the metal surface and rubber content of the body with which it is in contact during the final curing operation.

A suitable hard rubber coating composition may be formed by mixing together 100 parts of pale crepe rubber, 1 part of benzothiazyl disulfide, .25 part of tetramethylthiuram disulfide, 10 parts of zinc oxide, 20 parts of lithopone, 100 parts of precipitated whiting, 20 parts of iron oxide $Fe_3O_3$, 2 parts of stearic acid, and 60 parts of sulphur, by weight, in a volatile vehicle. A volatile vehicle in which rubber is somewhat soluble, such as gasoline or petroleum naptha, is preferably used in sufficient quantity to reduce the viscosity of the composition so that it may be applied in layers of film-like thickness from a spray gun, by a brush, or by immersing the metal into the composition.

A suitable soft rubber composition may be formed by mixing together 100 parts of rubber, 1 part of mercapto rinzo thiozole, 10 parts of zinc oxide, 30 parts of channel carbon block, 4 parts of stearic acid, and 5 parts of sulphur with a solvent of the above character.

In Fig. 1 of the drawing is diagrammatically illustrated one form of apparatus which is particular adapted for forming a continuous rubber coating on wire for general application, or for use in the fabrication of articles including either soft or hard rubber. This apparatus includes a support 10 having a spool 11 rotatably mounted thereon on which wire 12 is wound. The wire 12 may be formed of ferrous or non-ferrous metal and if desired it may have a plated or other coating on its exterior comprising brass or other metals or alloys to which rubber readily bonds. The wire is extended from the spool 11 over and under pulleys 13 and 14, respectively, mounted on a tank 15 and through the interior of the tank. The tank 15 is provided with a cleaning solution 16 comprising a caustic or other suitable cleaning composition. The wire 12 passes from the tank 15 over and under pulleys 17 and 18, respectively, of a rinsing tank 19 filled with water through which the wire 12 is also extended. The wire 12 then enters a heating device or oven 20 which, in the form shown, comprises an induction coil. Any other suitable oven capable of maintaining the desired temperature may be used. At this step in the method, the wire is dried and heated to substantially 180° F. then it is extended over and under pulleys 21 and 22, respectively, into a tank 23 where it is subjected to the application of the rubber coating composition. The composition may be applied on the wire by spraying it from an annular or other suitably shaped nozzle 24 and by immersing it in a bath 25 of the solution, or by spraying or immersing alone, as desired. When spraying alone is employed, the excess coating composition is conveyed from the tank 23 through a drain 26.

After the wire leaves the tank 23 it enters a second oven 27, which in the form shown, also comprises an induction coil, where the wire and deposit of coating material thereon are heated to a temperature above the curing temperature of the composition long enough to cause a partial or semi-curing of the rubber. This curing operation may also be conducted in any oven capable of maintaining the desired temperature. The desired degree of vulcanization can be produced by curing at from 212° F to 325° F. The duration of the partial curing treatment depends upon the nature of the composition and the temperature employed. A coating having the above compositions will cure to the proper condition upon heating at 315° F. for about 5 minutes. At this stage of the method, the coating should be only partially vulcanized and there should be present substantial quantities of unvulcanized rubber and uncombined vulcanizing agent.

If a coating of greater thickness than that provided by one application of the composition is desired, the wire is conducted through a second coating tank 28, substantially identical to the coating tank 23, wherein a second layer of the composition is applied on the first semi-cured layer by a nozzle 29 and by immersing the wire in a bath 30 of the composition, or by spraying or immersion alone. The wire 12 leaves the tank 28 and enters a second curing oven 31 where it is again subjected to a partial curing operation at from 212° F to 325° F. As the wire 12 passes out of the oven 31 it is preferably guided by rollers 32 into a batch of powdered soapstone 33 so as to prevent adhering together of successive convolutions of the coated wire as it is wound upon a spool 34 rotatably mounted upon a support 35. When the coated wire is to be integrally vulcanized with the rubber of a body it is sometimes desirable to omit the application of the soapstone film. Both the coating tanks 27 and 28 are provided with internal heating apparatus, such as pancake induction coils 29', by which the wire may be heated during the immersing operation, if desired.

In some instances, when two or more layers of the coating composition are applied, the curing treatment may be delayed until after the desired number of layers have been formed on the wire. This can be accomplished conveniently by maintaining the oven 27 at substantially 180° F. so as to merely remove the volatile vehicle of the first layer before the second layer is applied without curing the rubber.

For some uses of coated wire it is desirable to cure the coating thereof to completion and in this event the final heat treatment is prolonged until substantially all the available vulcanizing agent has combined with the rubber.

In Figs. 2 and 3 of the drawing is illustrated an application of rubber coated wire in the manufacture of tires. In this use the wire is preferably provided with a semi- or partially-cured coating of a hard rubber composition. The coated wire is cut into desired lengths and coiled into the form of a ring 36 having a plurality of adjacent convolutions which may be temporarily secured together in any suitable manner. The ring 36 is then molded into each bead portion 37 of the tire, as illustrated in Fig. 2. The tire is then heated, while confined in the mold 38, and maintained at a temperature above the curing temperature of the rubber until the rubber of the body thereof has cured to a desired extent. During this curing operation, vulcanization of the coating of the tire is continued to completion while the rubber of the body portion of the tire is cured. The coating is converted to a hard rubber state and it is integrally bonded with the metal surface of the wire, and the coatings of adjacent convolutions of the ring are integrally bonded with each other, as well as with the rubber content of the tire. Wire or metal parts of any form may be integrally bonded to the rubber content of a body by a yieldable connecting medium in substantially the same manner by employing a soft rubber coating composition in place of the hard rubber coating composition.

As illustrated in Fig. 4, wire or other metal parts 39 having semi-cured rubber coatings 40 formed thereon in accordance with our improved method may be built up into diverse articles in which portions of the coatings of the parts contact with each other. The metal parts or strands of wire having partially vulcanized rubber coatings thereon are assembled in a desired relation, and if necessary, are temporarily bound or otherwise held in place. The resulting unit is then subjected to a heat treatment at a temperature above the curing temperature of the rubber, such as at 315° F. During this operation the coatings of the parts are cured either to completion or to any desired extent and those portions of the coatings which contact with each other are integrally bonded together while the coating of each part of the structure is integrally bonded to the metal surface with which it contacts. Obviously, the nature of the external surface of the resulting structure depends upon the type of coating composition used. A hard or soft rubber exterior may be formed by employing the appropriate coating composition and curing for the required length of time.

By virtue of our improved method integral bonds between metal surfaces and either hard or soft rubber portions of a structure are obtainable and the bonded surface of the metal is effectively protected from corrosion.

Although but several specific embodiments of the invention are herein shown and described, it will be understood that various changes in the materials employed and in the sequence and duration of the steps, as well as in the size, shape, and arrangement of parts, may be made without departing from the spirit of our invention, and it is not our intention to limit its scope other than by the terms of the appended claims.

What we claim is:

1. The method of securing together a piece of metal and a body including rubber which consists in fixing on a surface of said metal during a partial curing operation a film-like semi-cured non-tacky rubber coating having a capacity for further curing, thereafter placing a body including vulcanizable rubber in contact with the exposed surface of said semi-cured coating, and heating the resulting unit during a subsequent curing operation to cause the rubber of said body and coating to cure while in contact with each other and to cause said coating to become integrally bonded with said metal surface and with the rubber of said body.

2. The method of securing together a piece of metal and a body including rubber which consists in fixing on a surface of said metal during a partial curing operation a film-like semi-cured non-tacky hard rubber coating capable of being vulcanized to a hard rubber state, thereafter placing a body including vulcanizable rubber in contact with the exposed surface of said semi-cured coating, and heating the resulting unit during a subsequent curing operation to cure the rubber of said body and to vulcanize said coating to a hard rubber state while in contact therewith and to cause said coating to become integrally bonded with said metal and with the rubber of said body.

3. The method of securing together a piece of metal and a body including rubber which consists in applying on a surface of said metal a film-like vulcanizable rubber coating composition, heating said coating to cause the same to vulcanize to a semi-cured non-tacky state and to become fixed to said metal surface, thereafter placing a body including vulcanizable rubber in contact with the exposed surface of said semi-cured coating, and heating the resulting unit to cause the rubber of said body and said coating to cure while in contact with each other and to cause said coating to become integrally bonded with said metal surface and with the rubber of said body.

4. The method of securing together a piece of metal and a body including rubber which consists in applying on a surface of said metal a film-like vulcanizable hard rubber coating composition, heating said coating to cause the same to vulcanize to a semi-cured non-tacky state while in contact with said metal surface and to become fixed thereto, thereafter placing a body including vulcanizable rubber in contact with the exposed surface of said semi-cured coating, and heating the resulting unit to cure the rubber of said body and to vulcanize said coating to a hard rubber state while in contact therewith and to cause said coating to become integrally bonded with said metal surface and with the rubber of said body.

5. The method of securing together a piece of metal and a body including rubber which consists in heating the surface of said metal, applying on said surface while the latter is heated a film-like vulcanizable rubber coating composition, heating said coating to cause the same to vulcanize to a semi-cured non-tacky state and to become fixed to said metal surface, thereafter placing a body including vulcanizable rubber in contact with the exposed surface of said semi-cured coating, and heating the resulting unit to cause the rubber of said body and said coating to cure while in contact with each other and to cause said coating to become integrally bonded with said metal surface and with the rubber of said body.

6. The method of securing together a piece of metal and a body including rubber which consists in heating the surface of said metal, applying on said surface while the latter is heated a solution containing a volatile solvent and having therein the ingredients of hard rubber in unvulcanized state and including an uncombined vulcanizing agent, heat curing said coating to a semi-cured state while in contact with said metal surface to fix the coating to said surface, placing a body including vulcanizable rubber in contact with said semi-cured coating, and heating the resulting unit to cure the rubber of said body and to vulcanize said coating to a hard rubber state while in contact therewith and to cause said coating to become integrally bonded with said metal surface and with the rubber of said body.

7. The method of securing together a piece of metal and a body including rubber which consists in applying on a surface of said metal a film-like deposit of a vulcanizable rubber coating composition having a volatile vehicle, heating said deposit to drive off said solvent, applying further film-like deposits of said coating composition on said first film-like deposit and heating each successive deposit to drive off the vehicle thereof before the next deposit is applied whereby to build up a succession of layers of said coating composition, heat curing said layers to a partially cured state, placing a body including unvulcanized rubber in contact with said partially cured coating, and heating the resulting unit to cause the rubber of said body and said coating to cure while in contact with each other and to cause said layers of coating composition to become integrally bonded with said metal surface and with the rubber of said body.

8. The method of securing together a piece of metal and a body including rubber which consists in applying on a surface of said metal a film-like deposit of a vulcanizable hard rubber coating composition having a substantial quantity of a free vulcanizing agent, heat curing said deposit to a partially cured state while in contact with said metal surface, applying further film-like deposits of said coating composition on said first film-like deposit and heat curing each successive deposit to a partially cured state before the next deposit is applied, placing a body including unvulcanized rubber in contact with said coating, and heating the resulting unit to cure the rubber of said body and to vulcanize said coating to a hard rubber state while in contact therewith and to cause said coating to become integrally bonded with said metal surface and with the rubber of said body.

9. The method of fabricating an article including rubber and including metal parts which consists in fixing on the surfaces of the metal parts individual substantially non-tacky coatings comprising semi-cured rubber, assembling such parts in a desired relation with portions of their coatings in contacting relation, and heating the resulting unit to cure said coatings and to cause the same to become integrally bonded with said metal surfaces and the contacting portions thereof to become integrally bonded together.

10. The method of fabricating an article including rubber and including metal parts which consists in fixing on the surface of the metal parts individual coatings comprising a semi-cured non-tacky hard rubber composition having a substantial quantity of uncombined vulcanizing agent, assembling such parts in a desired relation with portions of the coatings in contacting relation, and heating the resulting unit to cure said coatings to a hard rubber state and to cause the same to become integrally bonded with said metal surfaces and the contacting portions thereof to become integrally bounded together.

11. The method of fabricating an article including rubber and metal wire which consists in fixing on the surface of said metal wire a coating comprising a semi-cured non-tacky rubber composition, forming said coated wire to a desired contour with the coatings of portions thereof overlapping in contacting relation, and heating the resulting product to cure said coating and to cause the same to become integrally bonded with said metal surface and the contacting portions of the coating to become integrally bonded together.

12. The method of fabricating an article including rubber and metal wire which consists in fixing on the surface of said metal wire a coating comprising a semi-cured hard rubber composition having a substantial quantity of uncombined vulcanizing agent, forming said coated wire to a desired contour with the coatings of portions thereof overlapping in contacting relation, and heating the resulting product to cure said coating to a hard rubber state and to cause the same to become integrally bonded with said metal surfaces and the contacting portions thereof to become integrally bonded together.

13. The method of fabricating an article including rubber and metal wire which consists in applying on the surface of said wire a vulcanizable rubber coating composition, heating said coating to cause the same to vulcanize to a partially cured state and to become fixed to said metal surface, forming said coated wire to a desired contour with the coatings of portions thereof overlapping in contacting relation, and heating the resulting product to cure said coating and to cause the same to become integrally bonded with said metal surface and the contacting portions of the coating to become integrally bonded together.

14. The method of fabricating an article including rubber and metal wire which consists in heating said wire, applying on the surface of said wire a coating including a film-like layer of a composition having unvulcanized ingredients of hard rubber in a volatile vehicle while said wire is heated to a temperature high enough to effect substantially complete removal of said vehicle, heating said film-like layer to remove said vehicle and to cause the same to vulcanize to a partially cured state, forming said coated wire to a desired contour with the partially cured coating of portions thereof overlapping in contacting relation, and heating the resulting product to cure said coating to a hard rubber state and to cause the same to become integrally bonded with the surface of said wire and the contacting portions thereof to become integrally bonded together.

15. The method of securing together a piece of metal and a body including rubber which consists in applying on the surface of said metal successive layers of a composition containing the ingredients of hard rubber in an unvulcanized state and including a free vulcanizing agent, heat curing each layer before the next is applied until a substantial part materially less than all of said vulcanizing agent is combined chemically with the rubber of said composition, molding a body including vulcanizable rubber on said coated metal, and heating the resulting unit to cure the rubber of said body and to vulcanize said layer to a hard rubber state and to cause said layer to become integrally bonded with said metal surface and with the rubber of said body.

ROGER K. LEE.
WILLETT J. McCORTNEY.